US012771059B2

(12) United States Patent
Schwarz et al.

(10) Patent No.: US 12,771,059 B2
(45) Date of Patent: Oct. 20, 2026

(54) CONNECTOR MODULE AND METHOD FOR PRODUCING SAME

(71) Applicant: HARTING Electric Stiftung & Co. KG, Espelkamp (DE)

(72) Inventors: Andreas Schwarz, Bünde (DE); Irina Lötkemann, Espelkamp (DE)

(73) Assignee: HARTING Electric Stiftung & Co., KG, Espelkamp (DE)

( * ) Notice: Subject to any disclaimer, the term of this patent is extended or adjusted under 35 U.S.C. 154(b) by 337 days.

(21) Appl. No.: 18/693,460

(22) PCT Filed: Sep. 28, 2022

(86) PCT No.: PCT/DE2022/100722
§ 371 (c)(1),
(2) Date: Mar. 19, 2024

(87) PCT Pub. No.: WO2023/061530
PCT Pub. Date: Apr. 20, 2023

(65) Prior Publication Data

US 2024/0291193 A1 Aug. 29, 2024

(30) Foreign Application Priority Data

Oct. 12, 2021 (DE) ..................... 10 2021 126 400.6

(51) Int. Cl.

| | |
|---|---|
| ***H01R 13/514*** | (2006.01) |
| ***H01R 13/518*** | (2006.01) |
| ***H01R 13/639*** | (2006.01) |
| ***H01R 13/6582*** | (2011.01) |

(52) U.S. Cl.
CPC ......... *H01R 13/514* (2013.01); *H01R 13/518* (2013.01); *H01R 13/639* (2013.01); *H01R 13/6582* (2013.01)

(58) Field of Classification Search
CPC ............................ H01R 13/514; H01R 13/518
See application file for complete search history.

(56) References Cited

U.S. PATENT DOCUMENTS

| | | | |
|---|---|---|---|
| 6,004,162 A | 12/1999 | Harting et al. | |
| 6,317,332 B1 * | 11/2001 | Weber .................. | E05F 15/697 310/71 |
| 2003/0194914 A1 | 10/2003 | Duck et al. | |
| 2004/0053534 A1 | 3/2004 | Beneke et al. | |
| 2007/0155252 A1 | 7/2007 | Ferderer | |
| 2011/0217880 A1 | 9/2011 | Schmidt et al. | |
| 2014/0179172 A1 | 6/2014 | Riepe et al. | |
| 2015/0199603 A1 | 7/2015 | Troeger et al. | |
| 2015/0280351 A1 | 10/2015 | Bertsch | |

(Continued)

FOREIGN PATENT DOCUMENTS

| | | |
|---|---|---|
| CN | 107910680 A | 4/2018 |
| CN | 207559193 U | 6/2018 |

(Continued)

*Primary Examiner* — Phuong K Dinh
(74) *Attorney, Agent, or Firm* — Smartpat PLC

(57) ABSTRACT

In order to be able to modify earthing concepts as quickly, flexibly and easily as possible, the earth connection of the shielding housings (20, 20') of a connector module is produced by contact springs (3) that can be clipped onto and removed from the short side of the module's insulating body (1, 1') from the exterior.

15 Claims, 5 Drawing Sheets

(56) References Cited

U.S. PATENT DOCUMENTS

| | | | |
|---|---|---|---|
| 2016/0056567 A1 | 2/2016 | Dugo | |
| 2016/0093980 A1 | 3/2016 | Beischer et al. | |
| 2016/0140388 A1* | 5/2016 | Ichikawa ........... | G06V 30/1444 348/143 |
| 2016/0276778 A1 | 9/2016 | Beischer et al. | |
| 2018/0115103 A1 | 4/2018 | Schlegel | |
| 2018/0254578 A1 | 9/2018 | Herbrechtsmeier et al. | |
| 2021/0021086 A1 | 1/2021 | Dück et al. | |
| 2023/0114787 A1 | 4/2023 | Meier | |

FOREIGN PATENT DOCUMENTS

| | | | |
|---|---|---|---|
| DE | 29601998 | U1 | 5/1996 |
| DE | 202011050643 | U1 | 8/2011 |
| DE | 202013103611 | U1 | 9/2013 |
| DE | 102012107270 | A1 | 2/2014 |
| DE | 102012110907 | A1 | 5/2014 |
| DE | 102013106279 | A1 | 12/2014 |
| DE | 102013108383 | A1 | 2/2015 |
| DE | 102013113975 | A1 | 6/2015 |
| DE | 102015106416 | | 6/2016 |
| DE | 102015103563 | A1 | 9/2016 |
| DE | 102015104562 | A1 | 9/2016 |
| DE | 102015114703 | A1 | 3/2017 |
| DE | 102016116926 | A1 | 3/2018 |
| DE | 102018108968 | A1 | 10/2019 |
| DE | 102018122848 | A1 | 3/2020 |
| DE | 102019101822 | A1 | 7/2020 |
| DE | 102020107725 | | 5/2021 |
| EP | 0860906 | A2 | 8/1998 |
| EP | 1026788 | A1 | 8/2000 |
| EP | 1353412 | A2 | 10/2003 |
| EP | 1801927 | A1 | 6/2007 |
| EP | 1398853 | B1 | 8/2012 |
| EP | 2510589 | | 10/2012 |
| EP | 2510590 | A1 | 10/2012 |
| EP | 2917974 | A1 | 9/2015 |
| EP | 2979326 | A1 | 2/2016 |
| EP | 3067993 | B1 | 1/2019 |

* cited by examiner

CONNECTOR MODULE AND METHOD FOR PRODUCING SAME

CROSS-REFERENCE TO RELATED APPLICATION

This application is a national stage application, filed under 35 U.S.C. § 371, of International Patent Application PCT/DE2022/100722, filed on Sep. 28, 2022, which claims the benefit of German Patent Application DE 10 2021 126 400.6, filed on Oct. 12, 2021.

TECHNICAL FIELD

The disclosure relates to a plug connector module, to a method for producing a plug connector module, a plug connector modular system which has a metal or at least partially metal plug connector modular frame and at least one plug connector module according, to a plug connector having an at least partially metal plug connector housing and a plug connector modular system which is inserted therein, to a method for producing a plug connector modular system, and to a contact spring.

BACKGROUND

In the prior art, plug connector modular systems with plug connector modules using a plug connector modular frame, also known as a retention frame, modular frame, articulated frame or module frame, are disclosed in numerous documents and publications in many different variants, shown at exhibitions and are often used in the industrial environment in the form of heavy-duty plug connectors. For example, they are described in the documents DE 10 2013 106 279 A1, DE 10 2012 110 907 A1, DE 10 2012 107 270A1, DE 20 2013 103 611 U1, EP 2 510 590 A1, EP 2 510 589 A1, DE 20 2011 050 643 U1, DE 296 01 998 U1, EP 1 353 412 A2, DE 10 2015 104 562 A1, EP 3 067 993 A1, EP 1 026 788 A1, EP 2 979 326 A1, EP 2 917 974 A1.

Document EP 0 860 906 B1 discloses a plug connector modular frame in the form of an articulated frame for retaining plug connector modules and for installation in plug connector housings or for screwing to wall surfaces. In this instance, the plug connector modules are inserted into the plug connector modular frame. There are provided on the plug connector modules retention means which cooperate with apertures which are provided on opposing side portions of the plug connector modular frame, wherein the apertures comprise rectangular recesses which are in the form of through-openings which are closed at all sides in the side portions of the plug connector modular frame.

In the embodiment as an articulated frame, the plug connector modular frame comprises two frame halves which are connected to each other in an articulated manner, wherein the separation of the plug connector modular frame is provided transversely relative to the side portions of the frame. In the securing ends of the plug connector modular frame, joints are arranged in such a manner that the side portions, when the plug connector modular frame is screwed onto a securing face, are orientated at right-angles relative to the securing face, whereby the plug connector modules via the retention means form a positive-locking connection with respect to the plug connector modular frame. In practice, such plug connector modular frames are generally produced in a pressure die-casting method, in particular in a zinc pressure die-casting method.

Document DE 10 2015 114 703 A1 discloses a further development of such a plug connector modular frame which is in the form of an articulated frame. The plug connector modular frame disclosed therein has at least one fixing means via which the frame halves can be fixed with respect to each other in two positions, an open position and a closed position, which simplifies the handling considerably.

Document DE 20 2013 103 611 U1 sets out two frame halves which can be screwed to each other in an extremely stable manner and which can be produced in an economical manner using punching bending technology and which can be screwed together and which are suitable for receiving inter alia pneumatic modules. The plug connector modular frame which is mounted in this manner has even under high mechanical long-term loading only very small creeping properties. However, the disadvantage is that the level of complexity for adding or replacing a plug connector module is extremely high.

It has been found in practice that such plug connector modular frames during the assembly require a complex operation. For example, such plug connector modular frames have to be unscrewed and/or unlocked from the plug connector housing as soon as only a single module is intended to be replaced. In this instance, the other plug connector modules whose removal was not desired at all, may potentially also fall out of the plug connector modular frame and must then be inserted again before being screwed together and/or before the locking of the frame halves. Finally, even before the frame halves are joined together, all the plug connector modules must at the same time be located in the position provided for them in order, when the frame halves are joined together, to be finally fixed in the plug connector modular frame, which makes the assembly more difficult.

The document EP 1 801 927 B1 discloses a single-piece plug connector modular frame which comprises plastics material. The plug connector modular frame is in the form of a circumferential collar and has at the insertion side thereof a plurality of wall segments which are separated by slots. Two opposing wall segments in each case form an insertion region for a plug connector module, wherein the wall segments have aperture-like openings which serve to receive projections which are formed on the narrow sides of the plug connector modules. Furthermore, a guiding groove is provided in each of the wall segments. The guiding groove is formed above the openings by means of an outwardly offset aperture web which has a chamfered introduction portion on the inner side. In addition, the plug connector modules have locking arms which are formed on the narrow sides acting in the direction of the cable connections and lock below the lateral collar wall so that two independent locking means fix the plug connector modules in the plug connector modular frame. This plastics material frame has the disadvantage that it has does not enable any protection earthing (PE) since it has no electrically conductive material.

Document DE 10 2013 113 975 B4 discloses a plug connector modular frame, in particular made of die-cast zinc, for a heavy-duty plug connector for receiving identical and/or different plug connector modules. The plug connector modular frame comprises a base frame which is rectangular in cross section and which has two opposing side portions. A cheek portion comprising a flexible material, in particular resilient sheet metal, is fitted to the side portions in each case. When a plug connector module is inserted into the plug connector modular frame perpendicularly to the frame plane, these cheek portions are first bent outward away from the side portion. In particular, the cheek portions may have flaps with locking apertures which are suitable for locking the plug connector modules at their securing projections individually in the plug connector modular frame. The plug connector modules can consequently be inserted individually and with only little complexity from the cable connection direction and in the insertion direction into the plug connector modular frame and removed again in the opposing direction. The inserted plug connector module is retained in a secure and stable manner by the base frame of the plug connector modular frame in the frame plane. In the insertion direction thereof, perpendicular to the frame plane, they can be locked with the securing lugs thereof in each case between mutually opposing cheek portions. This structure has in principle the advantage that the plug connector modules can be individually inserted and removed without the securing of the other plug connector modules being impaired thereby. The structure further enables the plug connector modular frame to comprise metal and to have a PE contact or to be provided with one and consequently enables the protective earthing of a metal plug connector housing, in which the plug connector modular frame is screwed, and to a degree also an electrically and/or magnetically shielding function of the plug connector modules.

In principle, in the prior art, there is the disadvantage that, even when metal plug connector modular frames are used, the electrical shielding of individual plug connector modules, in particular for plug connector modules which are provided for electrical signal transmission, in particular high-frequency digital electrical signal transmission, is not always sufficient.

As a result of a lack of shielding, it may undesirably be the case that in particular electrical signals which are transmitted via plug connector modules are subjected to interference by electrical and/or magnetic fields which are produced outside the respective plug connector module but inside the plug connector modular frame. Such occurrences of interference may, for example, be produced by the electrical energy supply with alternating current. Furthermore, electrical and/or magnetic fields which are produced outside the plug connector modular frame may also interfere with the mentioned electrical signals within the plug connector module.

For an interference-radiation-free transmission of signals, the document EP 1 398 853 B1 proposes to this end that a plug connector module has in a retention member which comprises insulating material an electrically conductive shell housing having a plug insert. The plug connector module is retained by means of locking means in a plug connector modular frame which in turn is integrated in a plug connector housing. Within the shell housing, an electrically conductive contacting to the shielding of a signal-conducting cable is provided so that a plurality of plug connector modules, with earth potentials which are independent of each other, and also plug connector modules which transmit a power supply, pneumatics or the like without influencing each other can also be arranged in the module carrier apparatus.

In this construction, it has been found to be disadvantageous for many applications that no shielding transmission and consequently no direct potential compensation of the shield between the plug connector module and a plug connector module of a mating connector which is inserted therewith is present. This has been found to be disadvantageous in particular for high-frequency signals.

In order to combat this problem, document DE 10 2018 108 968 A1 discloses that both plug connector modules which are inserted with each other—or intended to be inserted—each have a shielding transmission element. With this shielding transmission element, a cable which is connected at the cable connection side to each plug connector module is connected, for example, to a shielding braid. The shielding transmission elements each cover a side face of the plug connector module extensively and can be electrically contacted with each other at the connection side. Both shielding transmission elements comprise a metal material which in particular has good electrically conductive properties. As a result of these shielding transmission elements, the wave resistance, also referred to as wave impedance, can be significantly reduced.

During operation of this construction, however, it has been found to be disadvantageous that the cross section of the earth connection of the connected cable is often too small. Furthermore, no direct potential compensation between a metal plug connector modular frame and the shielding transmission elements is still thereby ensured. The shields known from the prior art are interrupted at least at the narrow sides of the substantially cuboid plug connector modules. Plug connector modules which are already commercially available cannot accordingly be retrofitted with the known shielding apparatuses.

The document DE 10 2020 107 725 B3 addresses this topic and has the objective of improving the shielding of a plug connector module and a plug connector modular system which is provided therewith in order to thereby ensure a particularly high quality of the electrical signals transmitted by the plug connector module. In particular, the negative influence of high-frequency electrical and/or magnetic interference fields on the signal quality of these signals is intended to be minimized.

To this end, the above-mentioned document discloses surrounding the plug connector module in a positive-locking manner at the wide and narrow sides thereof with a circumferential shielding element, wherein the shielding element in each case covers more than 50% of the surface-area of the wide and the narrow sides. The shielding element ensures at the same time the earth connection of the metal plug connector modular frame to a shielding transmission element of the plug connector module and consequently also an earth connection to the mating connector. In order to implement this, it is disclosed that the shielding element, in order to produce an additional electrically conductive connection to the plug connector modular frame at least at one of the narrow side walls thereof, has at least one outwardly directed contact flap and is electrically connected to the plug connector modular frame via this outwardly directed contact flap. The shielding element can consequently also itself be circumferentially earthed multiple times and can thereby suppress the influence of in particular high-frequency electrical and/or magnetic external interference fields in a particularly effective manner.

A significant disadvantage in the current prior art is as before that the plug connector modules cannot be retrofitted—or at least not with reasonable complexity—with a shielding connection. Often, however, according to the respective shielding concept, a shielding connection of the plug connector module to the plug connector modular frame is identified as being necessary only subsequently, that is to say, after the installation of a complex electrical system. Conversely, in the prior art, there is also the equally disadvantageous case that the client for specific applications, for example, in order to avoid so-called ground loops, wishes to separate such a shielding connection either already during construction or only afterwards after closer analysis, for example, as a result of problems which occur or after an expansion of the electrical system, but fears or criticizes the complexity which is involved in removing this shielding connection to all plug connections required for this purpose.

Finally, the shielding concept can also change during an installation or expansion of the electrical system so that the mentioned shielding connection of individual plug connector modules to the metal retention frame is accordingly intended to be retrofitted or removed in accordance with requirements. The mentioned electrical system may, for example, be a production plant/a production line or the like. The relevant plug connector modules may as a component of this system be used for electrical signal transmission, for example, for data transmission of control, measurement and/or state data in plug connector modular systems and therefore be particularly susceptible to electrical interference and therefore particularly reliant on a shielding and earthing concept which is as far as possible interference-free.

The German Patent and Trademark Office has in the priority application relating to the present application searched the following prior art: DE 10 2013 113 975 B4; DE 10 2015 106 416 B3; DE 10 2020 107 725 B3; DE10 2012 107 270 A1; DE 10 2012 110 907 A1; DE 10 2013 106 279 A1; DE 10 2013 108 383 A1; DE 10 2015 104 562 A1; DE 10 2015 114 703 A1; DE 10 2016 116 926 A1; DE 10 2018 108 968 A1; DE 10 2018 122 848 A1; DE 10 2019 101 822 A1; DE 296 01 998 U1; DE 20 2011 050 643 U1; DE 20 2013 103 611 U1; EP 0 860 906 B1; EP 1 398 853 B1; EP 1 801 927 B1; EP 1 026 788 A1; EP 1 353 412 A2; EP 2 510 589 A1; EP 2 510 590 A1; EP 2 979 326 A1; EP 3 067 993 A1; CN 1 07 910 680 A and CN 2 07 559 193 U.

SUMMARY

Plug connector modules can in principle be used as a component of plug connector modular systems in order to be able to adapt a plug connector, in particular a heavy industrial plug connector, in a flexible manner to specific requirements with regard to the signal and energy transmission, for example, between two electrical devices. Extremely varied, for example, optical and/or electrical, analogue and/or digital signals and/or electrical energy and/or compressed air ("pneumatics") can thus be transmitted via a plug connection depending on requirements by the use of plug connector modules which can be assembled in a flexible manner.

The plug connector modules generally each have an insulating member. These insulating members may be configured in a substantially cuboid manner and consequently have two mutually opposing end faces and perpendicularly thereto two mutually opposing side faces, wherein the end faces each have a width which is smaller than the width of the two side faces. For securing in the plug connector modular frame, each plug connector module advantageously has on both end faces thereof a projection, for example, a securing lug, which can also be configured in a substantially cuboid manner, wherein it may have at the plug side a so-called "chamfer" so that the corners thereof on the plug are slightly beveled.

The two projections, in particular securing lugs, of a module may differ from each other, for example, in terms of their shape and/or size, in particular as a result of their width, in order to thereby determine the orientation of each module in the retention frame. In other words, the securing lugs in addition to their retention function as a result of their shape and/or size can also be used as coding means, in particular as polarization means, that is to say, also for orientating the modules in the retention frame.

An insulating member of a plug connector module may in specific embodiments be configured in two pieces and comprise a contact carrier and a retention plate. It can thereby receive plug contacts in contact chambers of the contact carrier and by clip-fitting the retention plate on the contact carrier fix them therein in order to absorb insertion and pulling forces.

An insulating member may, however, also be configured in one piece and be used to lock plug contacts which are arranged in continuous contact chambers in the contact chambers, for example, by means of locking arms which protrude into the contact chambers. In the latter case, a special tool may be required to remove the contacts from the insulating member in order to unlock the contacts from the locking arms.

The plug contacts of different plug connector modules may in this instance according to the different functions, which have already been indicated, of the respective plug connector modules be of extremely different types. The function of a plug connector which is thereby formed is thereby also very flexible. For example, pneumatic modules, optical modules, modules for transmitting electrical energy and/or electrical analogue and/or digital signals may be received in the respective insulating member or housing and thus be used in the plug connector modular system. Increasingly, plug connector modules also perform technical measurement and data functions and are therefore particularly sensitive with regard to disruptions, with particular regard to electrical and/or magnetic interference fields and interference.

In order to retain a plurality of the modules in a, for example, metal plug connector housing, that is to say, for example, a heavy-duty plug connector housing, in particular metal plug connector modular frames can be used. To this end, the desired plug connector modules are inserted into fitting plug connector modular frames which are sometimes also referred to as retention frames, articulated frames, module frames or modular frames. The plug connector modular frames consequently serve to receive a plurality of mutually identical and/or different plug connector modules and to secure them securely to a face and/or a device wall and/or in a plug connector housing or the like.

The plug connector modular frames which serve to receive and to retain the plug connector modules may be available in various constructions and can depending on the application field be made from various materials, for example, plastics material or metal, in particular zinc and/or aluminum alloys, and be produced, for example, in pressure diecasting. The structures of plug connector modular frames are varied.

A metal plug connector modular frame may, for example, be in the form of an articulated frame and be formed by two frame halves which can be pivoted with respect to each other and which are connected to each other in an articulated manner.

In the side portions of the two frame halves, there are provided recesses which are in each case in the form of openings which are closed at all sides, that is to say, so called "apertures", in which the securing lugs are introduced in a positive-locking manner when the plug connector modules are inserted into the plug connector modular frame. In order to insert the plug connector modules, the plug connector modular frame is folded open, that is to say, opened, wherein the frame halves are folded open about the joints at least to the extent that the plug connector modules can be inserted. Subsequently, the frame halves are folded together, that is to say, the plug connector modular frame is closed, wherein the retention means reach the recesses and a secure, positive-locking retention of the plug connector modules in the plug connector modular frame is brought about. In order to facilitate the insertion of the plug connector modules, a locking mechanism may be provided between the two frame halves.

However, for example, it is also possible to use plug connector modular frames with rigid base frames which in their side portions do not have any apertures, but instead at the edge thereof at the cable connection side only have webs, wherein between the webs recesses for insertion of the securing lugs of the plug connector modules at the cable connection side are formed. For polarization, the different width of these recesses at both side portions of the plug connector modular frame may correspond to the different width of the securing lugs of each module so that the modules can be received only in a correct orientation with the securing lugs thereof between the webs of each side portion. Such a base frame can preferably be produced in a pressure die-casting method, for example, in a zinc pressure die-casting method or aluminum pressure die-casting method.

In older constructions, the plug connector modules may in addition to the securing lugs thereof also have at the narrow sides thereof locking arms which are directed in the insertion direction with locking hooks which are formed thereon at the end side and which in the inserted state additionally engage behind the plug connector modular frame at the insertion edge thereof which faces the edge at the cable connection side.

In a generic further development of this construction, the base frame may be provided at the longitudinal sides thereof with a plurality of flexible cheek portions, for example, with punched bent components made of resilient sheet metal, wherein the cheek portions are in particular configured in a planar manner and have a rectangular base frame. In this instance, the cheek portions may have locking means, such as, for example, locking apertures or locking hooks or the like, on which the plug connector modules lock, for example, with the securing lugs thereof in the inserted state. The above-mentioned locking arms of the plug connector modules are when such a plug connector modular frame is used, therefore substantially redundant since they are no longer required for the actual retention function, but instead in the best case further act in an additionally stabilizing manner and can in the worst case at least with some constructions even have a disruptive effect on the removal of a plug connector module.

For example, for each plug connector module two cheek portions, that is to say, one on each longitudinal side of the base frame, may be provided or one or more cheek portions may also be used. The cheek portions may, for example, have one or more flaps. In this instance, adjacent flaps may be formed by means of a slot which extends into the respective cheek portion. On each cheek portion and/or each flap, for example, one locking means, for example, a locking aperture and/or a locking formation for locking the securing lugs of the plug connector modules may be arranged. Such plug connector modular frames have the advantage that the plug connector modules can be inserted with only little complexity and, for example, also in an automated manner, for example, by means of robots, individually into the plug connector modular frame and can be removed individually therefrom simply by being pushed at one side, in simple terms “like into a store”, in the plug connector modular frame.

All these metal or at least partially metal plug connector modular frames may have an earth connection, that is to say, an earthing connection for a separate earthing cable which may, for example, be provided as a PE (“Protective Earth”) connection but which inevitably also acts on an existing earthing concept. Such an earth connection/earthing connection may in an exemplary embodiment comprise an earthing screw which advantageously fixes in a particularly reliable manner, in another exemplary embodiment a contact spring arrangement which can advantageously be operated in a particularly comfortable manner, but also any other cable connection apparatus known to the person skilled in the art.

An object of the disclosure is to provide a plug connector module which is provided for electrical signal and data transmission and which enables adaptation which is non-complex and at the same time flexible as far as possible during handling to a changeable earthing concept of complex electrical systems.

The object is achieved by the subject-matter of the independent claims.

A plug connector module is provided to be received and retained in a metal or at least partially metal plug connector modular frame, that is to say, fixed therein. The plug connector module has a substantially cuboid insulating member. This insulating member has two mutually parallel, opposing end faces which have a substantially rectangular form with a length and a width, wherein the length exceeds the width thereof in each case, wherein the length extends in an insertion direction whilst the width is measured in principle at right-angles with respect to this insertion direction. On the end faces, an outwardly facing securing lug is formed in each case, wherein the two securing lugs differ from each other in terms of the size and/or shape thereof in order to ensure a correct orientation (“polarization”) of the plug connector module in the plug connector modular frame.

In a state perpendicular to the end faces, the insulating member has two mutually parallel, opposing side faces which also have a substantially rectangular shape having a length and a width, wherein the length thereof extends in the insertion direction and the width thereof—which is intended to be measured perpendicularly to the insertion direction—is greater than the width of the two end faces. In simple terms, the side faces also have a rectangular basic shape but are wider than the two end faces.

At the ends of the end and side faces, the insulating member has at a first end a connection region and, at a second end opposite the first end, an insertion region. Furthermore, the plug connector module has two continuous receiving openings which extend in the insertion direction and which thus connect the connection region to the insertion region, of which one is arranged in each case on one of the two end faces and in which in each case an elementary connector of the plug connector module is received and retained, or at least can be received and retained therein.

In particular, the insulating member may be configured in an integral manner. Preferably, the elementary plug connectors may be locked or at least able to be locked in the receiving openings, for example, by means of locking arms which are formed therein.

Each of the two elementary connectors has its own shielding housing which is preferably formed from metal and at least one plug contact which is arranged in the shielding housing. Furthermore, each elementary connector may have a contact carrier which is retained in a positive-locking manner in the shielding housing and which has at least one contact receiving member which extends in the insertion direction and in which the at least one plug contact is received.

The plug connector module has two contact springs which can be locked onto the insulating member at the end face from the outer side and which each have an inner contact tongue for contacting the respective shielding housing and an outer contact tongue for electrically contacting the plug connector modular frame.

Furthermore, the insulating member has locking means, in particular locking recesses, for locking the two contact springs. In addition, the insulating member has for each of the two contact springs in the respective end face a contact aperture through which the respective contact spring engages with the contact tongue thereof in order to electrically contact the shielding housing of the elementary connector which is arranged at this end face and to electrically connect the shielding housing to the metal plug connector modular frame when the plug connector module is retained in the plug connector modular frame.

A method for producing a plug connector module of the above-mentioned type has the following steps:

A. introducing the two elementary plug connectors into the two receiving openings of the plug connector module at the cable connection side;
B. locking one or both contact springs on the insulating member at the end face, wherein the respective contact spring engages through the respective contact aperture of the insulating member with the inner contact tongue thereof,
C. electrically contacting the respective shielding housing of one or both elementary plug connectors by means of the respective contact spring with the inner contact tongue thereof.

This method and in particular this sequence of the method steps has the advantage that the plug connector module can be used without, but where necessary with, the earth connection by means of one or two contact springs without having to disassemble the elementary connector for this purpose. Furthermore, the contact spring could where necessary also be subsequently removed again without having to disassemble the elementary connector.

In an alternative variant, the sequence of method step A and method step B can also be transposed so that method step B is carried out before method step A. This, as will be explained in greater detail below, is in particular enabled by the shape of the contact springs and in particular the contact tongue thereof. The advantage of this modified sequence (B, A, C) is that the insulating member can be supplied or stored with contact springs already locked therein and can where necessary be provided with elementary connectors which are assembled (that is to say, connected to an electric cable). Finally, in an advantageous embodiment, the elementary connectors may also be used independently, that is to say, without the insulating member and without the plug connector modular system, which increases the flexibility of use thereof.

A plug connector modular system has a metal or at least partially metal plug connector modular frame and at least one plug connector module of the above-mentioned type which is retained thereby, wherein at least one of the two contact springs is locked at the end face on the insulating member and, on the one hand, engages with the inner contact tongue thereof through the contact aperture of the respective end face and electrically contacts the shielding housing of the elementary plug connector which is arranged on this end face, and wherein the contact spring, on the other hand, with the outer contact tongue thereof electrically contacts the plug connector modular frame.

In particular, the plug connector modular frame may in addition have an individual earth connection for a separate earthing cable. Such an earth connection may in an exemplary embodiment comprise an earthing screw which advantageously fixes in a particularly reliable manner, in another exemplary embodiment a contact spring arrangement which can advantageously be operated in a particularly comfortable manner or also any other cable connection apparatus known to the person skilled in the art.

A method for producing a plug connector modular system of the above-mentioned type has the following steps:

A. introducing the two elementary plug connectors into the two receiving openings of the plug connector module at the cable connection side;
B. locking one or both contact springs on the insulating member at the end face, wherein the respective contact spring engages through the respective contact aperture of the insulating member with the inner contact tongue thereof,
C. electrically contacting the respective shielding housing of one or both elementary plug connectors by means of the respective contact spring with the inner contact tongue thereof,
D. receiving the plug connector module in the plug connector modular frame, and
E. retaining the plug connector module by means of the plug connector modular frame,
F. electrically contacting the plug connector modular frame by the respective contact spring by means of the outer contact tongue thereof and thereby producing an electrical earth connection between the plug connector modular frame and the respective shielding housing of the plug connector module.

Furthermore, a plug connector has an at least partially metal plug connector housing and a plug connector modular system of the above-mentioned type which is inserted therein and which is electrically conductively connected thereto.

Advantageous embodiments of the invention are set out in the dependent claims and the following description.

The complexity of producing a shield connection of a plug connector module to the plug connector modular frame or separating it therefrom is significantly reduced by the invention. This is particularly advantageous especially when, in order to change an earthing concept of a complex electrical installation, a large number of such shield connections and/or separations has to be carried out.

A particularly significant advantage of the invention is that plug connector modules and even individual elementary connectors within a plug connector module can be connected in a selective manner and without significant complexity to the earth of the plug connector modular frame and conversely can also be separated therefrom. A particularly significant flexibility with respect to the respective earthing concept of such an electrical installation, for example, a production installation/production line, is thereby provided.

It is thereby also possible in particularly complex individual cases with comparatively little complexity to test different earthing concepts in practice, for example, in order to compare the complex behavior of an installation which has already been installed under the different earthing concepts. For example, in specific cases, earthing concepts known to the person skilled in the art and the hybrid forms thereof can also be produced for test purposes for individual elementary connectors with comparatively little complexity and the behaviors thereof can be compared with each other.

This is particularly important and advantageous when the elementary connectors and consequently also the associated plug connector modules, are provided for electrical signal transmission, that is to say, for example, for electrical transmission of control, measurement and/or state data and are therefore particularly sensitive with respect to electrical interference.

The shield connection elements can be subsequently locked to the respective insulating member with only little complexity and can be removed again in an equally simple manner in order to change the shielding concept.

As already mentioned, the plug connector module has on both end faces a securing lug which may also be configured in a substantially cuboid manner and may have slight bevels ("chamfers"), in particular in an insertion direction. The two securing lugs of a module may differ from each other, for example, in terms of their shape and/or their size, in particular their length, in order to thereby determine the orientation of the respective plug connector module in the retention frame. In other words, the securing lugs may as a result of their shape and/or size be used as coding means, that is to say, polarization means, in order to orientate the modules in the retention frame.

The correct polarization is also particularly advantageous for the correct implementation of the earthing concept since, as a result of the two different securing lugs, the polarization of the plug connector module in the plug connector modular frame is determined. The earthing concept also cannot thereby be disrupted by means of a plug connector module which is retained with incorrect orientation in the plug connector modular frame (that is to say, "incorrectly polarized") if, for example, the shielding housing of one of the two elementary connectors of the plug connector module is connected to the plug connector modular frame in an electrically conductive manner by means of the respective contact spring and the shielding housing of the other elementary connector of the same plug connector module is selectively not connected to the plug connector modular frame. Without the mentioned polarizing action of the securing lugs, the desired shielding concept during insertion with a mating connector whose earthing also follows this intended earthing concept could under some circumstances even be significantly impaired since finally also, between the shielding housings of the plug connector and the shielding housings of the mating connector thereof, a shield transfer generally takes place.

In an advantageous embodiment, the elementary connectors are individual plug connectors which can also be used separately and which for the present application are retained in pairs as components of the mentioned plug connector module in the insulating member thereof, but in principle can also be used individually, that is to say, also without an insulating member, outside a plug connector modular system, as independent plug connectors. They can thereby advantageously be produced in relatively large batch numbers in a cost-effective manner and where necessary optionally be integrated in the mentioned plug connector module.

It is further particularly advantageous for the elementary connectors to be able to be removed from the insulating member without significant complexity without the contact springs having to be unlocked and removed for this purpose. The contact tongue of the respective contact spring may to this end advantageously extend in an insertion direction and thus, as a result of the resilient properties of the contact spring, rebound when the respective elementary connector is pulled out without tilting in an unfavorable manner.

The elementary connectors may in particular be a round plug connector. Preferably, they may be so-called "M12" round plug connectors but of course other round plug connectors, that is to say, round plug connectors with other thread sizes, may also be used, for example, also so-called "M8" round plug connectors.

In this instance, the term "M" means that the locking mechanism of this round plug connector where applicable is a so-called "metric" screw thread, wherein the diameter of the respective screw thread can be referred to in integral metric units (in this instance, millimeters). An M12 thread is generally characterized in that the diameter thereof is 12 mm and an M8 thread is generally characterized in that the diameter thereof is 8 mm.

Of course, however, round plug connectors of other diameters which may, for example, also be indicated in inches can also be used as elementary plug connectors.

The elementary plug connectors which are in particular in the form of round plug connectors may, for example, have X-shaped (that is to say, "cross-shaped") or Y-shaped shielding elements. In the case of an X-shape, the shielding element is a so-called "shield cross".

These two types of shielding elements are well known to the person skilled in the art. With an X-shaped shielding element, the shielding cross generally has four shield walls which are arranged symmetrically with respect to each other and which, when viewed in cross section, each form a right-angle with respect to the adjacent shield wall thereof and have a common section axis which generally extends in the insertion direction. In contrast, with the Y-shaped shielding element, two shield walls form a preferably acute angle and the third shield wall forms with respect to each of them the same angle, that is to say, is arranged symmetrically relative thereto.

The respective shielding element is generally received in a corresponding, X-shaped, that is to say, cross-shaped, or Y-shaped receiving member of an in particular substantially cylindrical contact carrier and may, for example, be produced in a pressure die-casting method, for example, a zinc die-casting method. The contact carriers, which, for example, have such a cross-like receiving member for inserting an X-coded shielding element are accordingly subdivided into four preferably identically sized segments, of which each one may in particular have two contact chambers in each case, for example, for receiving two plug contacts in each case which may advantageously be used together to transmit a differential signal. The respective shielding element, for example, the mentioned shield cross, may in particular be electrically connected to the shielding housing and thus be earthed by the shielding housing.

Alternatively or additionally, the shielding housing to which the shield element may where applicable be connected, may itself have a direct electrical earth connection to a shield, for example, a shield of an electric cable which is connected to the elementary plug connector. Furthermore, the shielding housing may also be earthed via its electrically conductive connection to another shielding housing of a mating connector which is connected to the plug connector. In addition, as already mentioned, the plug connector modular frame can also be earthed via its own earth connection, via other plug connector modules, in particular a PE module which is specifically provided for this purpose and which has a particularly large PE line cross section and/or via the at least partially metal plug connector housing, in which the plug connector modular system may be optionally installed.

In an alternative embodiment, the elementary connectors have no shield cross which would have to be connected to the earth. Accordingly, the contact carriers thereof also have no cross-like receiving member. These contact carriers may receive at least one plug contact but generally receive a plurality of, for example, five plug contacts.

For cable connection and tension relief, the elementary connectors may each have a cable outlet on which the electrical cable which is connected to the elementary connector can be screwed or crimped. It is also thereby possible to produce an earth connection, for example, between a shield braid of the cable and the shielding housing of the respective elementary connector.

All these examples indicate how complex the electrical earthing both of individual plug connector modular systems and larger electrical installations which have a large number of such plug connectors with such plug connector modular systems can be. An accordingly important aspect is a flexible and non-complex possibility for coupling and uncoupling individually earthed elements of this installation from each other, as enabled by the possibility for separate electrical coupling and decoupling of the shielding housing of the elementary plug connectors from the respective at least partially metal plug connector modular frame in a particular user-friendly and non-complex manner.

BRIEF DESCRIPTION OF THE DRAWINGS

An exemplary embodiment of the invention is illustrated in the drawing and explained in greater detail below. In the drawings.

DETAILED DESCRIPTION

Figure 1A:
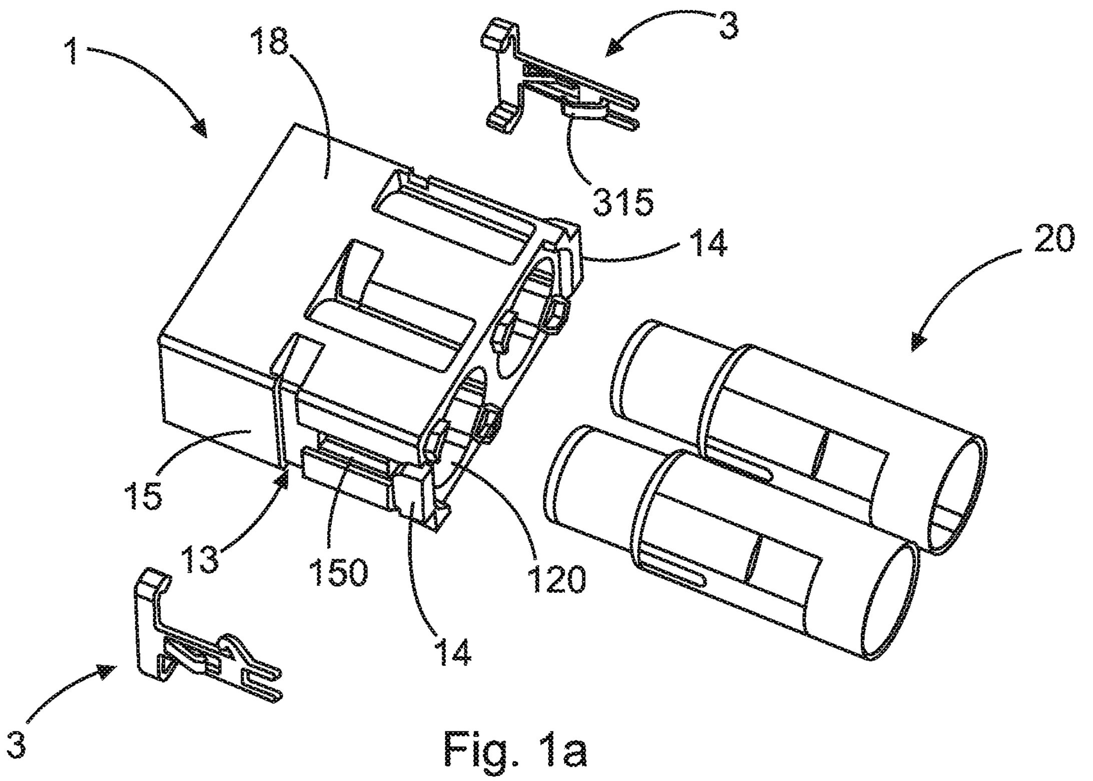
FIGS. 1*a, b* show basic structural elements of a first and a second plug connector module in the non-mounted state.

The Figures contain partially simplified, schematic illustrations. Identical reference numerals are sometimes used for the same but potentially non-identical elements. Different views of the same elements could be scaled differently. Direction indications, such as, for example, “left”, “right”, “top” and “bottom” are intended to be understood with reference to the respective Figure and may vary in the individual illustrations with respect to the object illustrated.

Figure 1B:
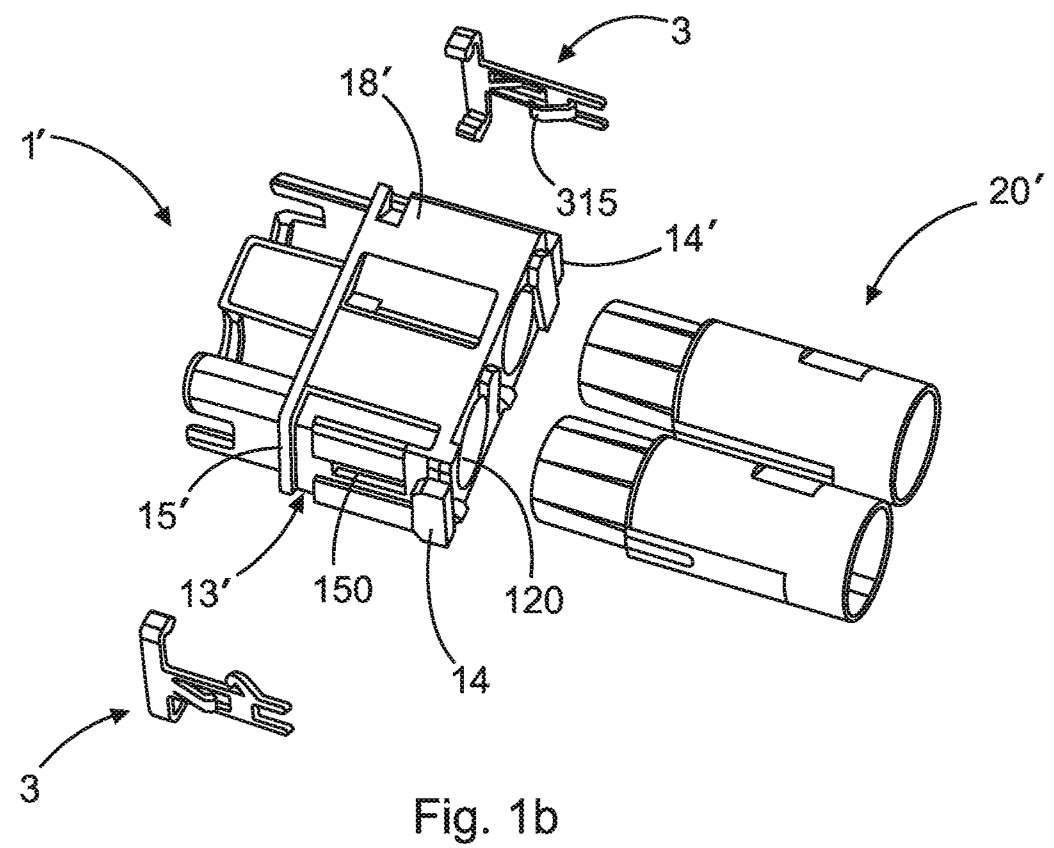

FIGS. 1*a* and 1*b* show a number of basic structural elements of a first or a second plug connector module in the non-mounted state. This includes in each case a substantially cuboid insulating member 1, 1' having two mutually opposing end faces 15 and two mutually opposing side faces 18, of which in the drawing only one 15, 18 can be seen since the opposing end face 15 or side face 18 is in each case covered by the insulating member 1 itself.

Furthermore, two substantially hollow-cylindrical shielding housings 20, 20' of the plug connector module which are a component of two independent elementary plug connectors 2, 2' which are shown below, and two contact springs 3 which can be locked on the insulating member 1, 1' at the narrow side, that is to say, locked on locking recesses 13, 13' are shown. Each of the contact springs 3 has an inner contact tongue 315 with which it engages in the assembled state through a contact aperture 150 of the end face 15, 15' in order to electrically contact the shielding housings 2, 2' which are arranged in receiving openings 120, 120' of the insulating member 1, 1'.

At the two mutually opposing narrow sides 15, 15' thereof, each insulating member 1, 1' further has a securing lug 14, 14', wherein the two securing lugs 14, 14' serve to secure the plug connector module in a plug connector modular frame (not shown). The two securing lugs 14, 14' of each insulating member 1, 1' differ from each other in order to thus ensure the correct polarization, that is to say, orientation of the plug connector module 1, 1' in the plug connector modular frame.

It is thereby further ensured that each of the two shielding housings 2, 2' is ultimately arranged at the correct side in the plug connector and, when the contact spring 3 is locked at this side, correctly undergoes the electrical earth connection thereof to the plug connector modular frame. It is consequently ensured that a planned earthing concept is also maintained in the plugged state.

From this viewpoint, it is further clear that the contact springs 3, even with shielding housings 20, 20' which have already been inserted into the receiving openings 120, 120', can be further very easily manually locked onto the insulating members 1, 1' and unlocked (that is to say, “clipped on and unclipped”). A plug connector can thereby be adapted to an earthing concept with only little complexity and/or an earthing concept can be changed with only little complexity.

Furthermore, the illustration also shows that, in particular as a result of the contact tongue 315 which extends in the insertion direction, the shielding housing 2, 2' with the contact springs 3 already locked on can also be inserted into the receiving openings 120 of the insulating member 1, 1' and also removed therefrom again.

The assembly complexity is thus very low and the assembly is extremely flexible. The insulating members 1, 1' may advantageously be supplied with contact springs 3 already clipped on. Where necessary, the contact springs 3 can ultimately also be removed in a non-complex manner. Where applicable, this can be done subsequently, that is to say, for example, only when the earthing concept is intended to be changed and a specific shielding housing 2, 2' is no longer intended to be connected in an electrically conductive manner to the at least partially metal plug connector modular frame (not shown).

Figure 2A:
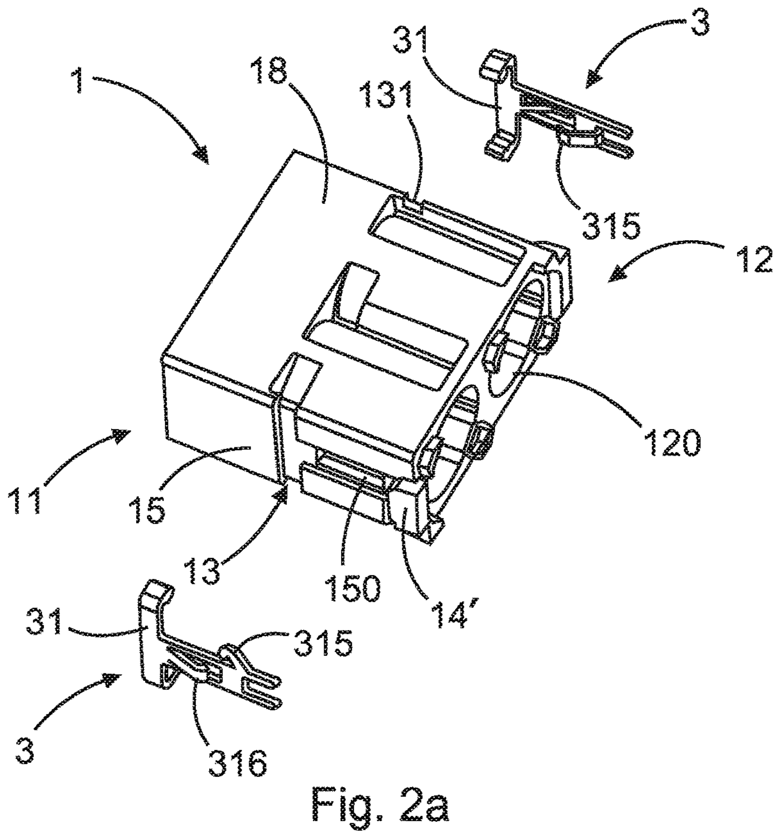
FIGS. 2*a, b* show an insulating member and two contact springs of the first or second plug connector module.
Figure 2B:
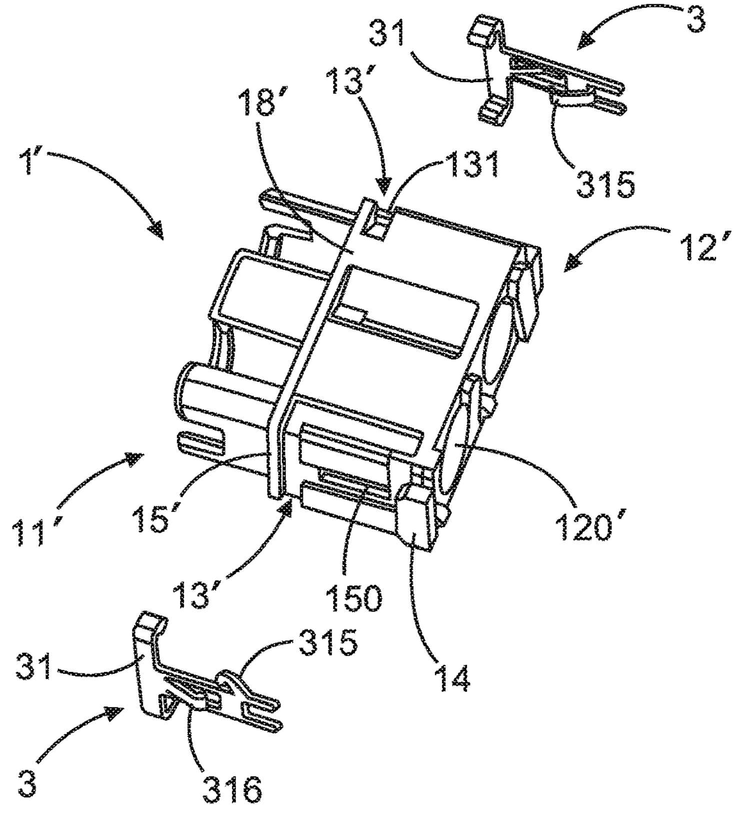

In FIGS. 2*a* and 2*b*, the respective insulating member 1, 1' is shown with the two locking springs 3 and labeled in detail. At the plug side, that is to say, in this instance illustrated on the left, the insulating members 1, 1' each have an insertion region 11, 11'; at the connection side, that is to say, at the cable connection side, they have a connection region 12, 12'.

The locking springs 3 have the mentioned inner contact tongue 315 with which they engage through the contact aperture 150 in the locked on (“clipped on”) state.

Opposite the inner contact tongue 315, the contact spring 3 has an outer contact tongue 316 for electrical connection of the respective shielding housing 2, 2' to the plug connector modular frame not shown in the drawings.

If one of the two contact springs 3 is now unclipped or even not locked onto (“clipped onto”) the insulating member 1, 1' at all, the respective shielding housing 2, 2' which is arranged at the respective narrow side 15, 15' does not undergo any direct electrical earth connection to the plug connector modular frame. For this reason, the mentioned polarization protection, as already mentioned, is also of particular importance to ensure the correct implementation of the respective shielding concept.

From this viewpoint, it is also clear that the locking recesses 13, 13' of the insulating member 1, 1' are not only located in the surface of the end faces 15, 15' but also extend into the surface of the side faces 18, 18'. In this region, the insulating member 1, 1' has in each case a locking edge 131 behind which the contact springs 3 engage with the locking arms 31 thereof.

Figure 3A:
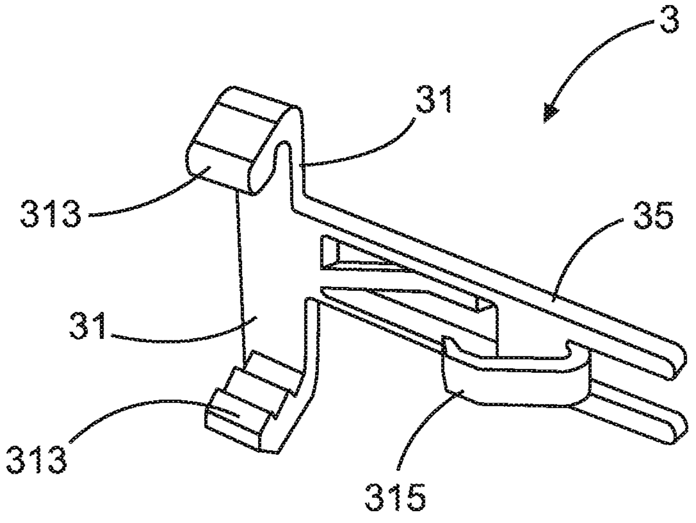
FIGS. 3*a, b* show the contact spring as two different views.
Figure 3B:
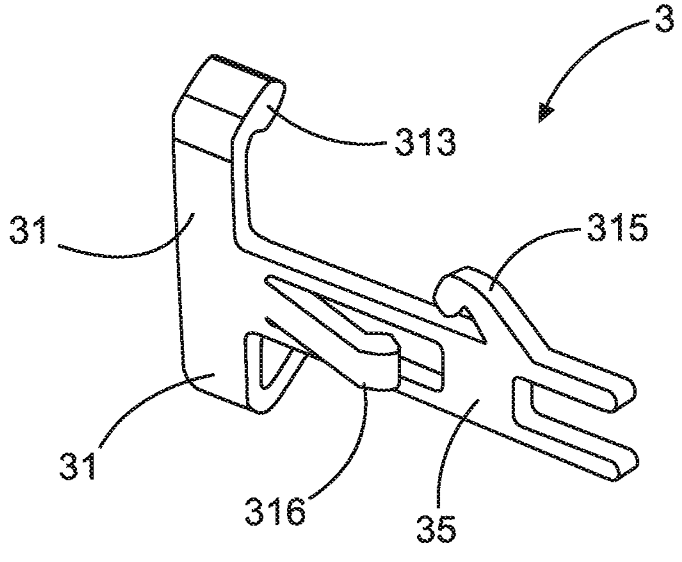

FIGS. 3*a* and 3*b* show such a contact spring 3 in an enlarged illustration from two different views. The contact spring 3 shown in this instance is, as can be easily seen by the person skilled in the art, a punched bent component which is formed in a cost-effective and non-complex manner from resilient sheet metal. In other embodiments, however, other materials and production methods could also be used, for example, resilient and electrically conductive plastics material which, for example, during injection-molding can be adapted in terms of thickness and shape in a particularly flexible manner to predetermined shapes of the insulating member 1, 1' and/or the shielding housing 20, 20' in order to provide a particularly good positive-locking retention with respect to the insulating member 1, 1' and/or a particularly large electrical contact face and consequently particularly good electrical conductivity with respect to the shielding housing 20, 20'.

The contact spring 3 shown in this instance has a planar base member 35. The inner contact tongue 315 and the outer contact tongue 316 are punched from this base member 35 and bent out of the plane of the base member 35. Furthermore, the contact spring 3 has two locking arms 31 which extend initially in the plane of the base member 35 and which protrude in opposing directions from each other at right angles from the base member 35 and but the ends of which are bent over by means of a locking bending operation to form locking hooks 313.

Figure 4A:
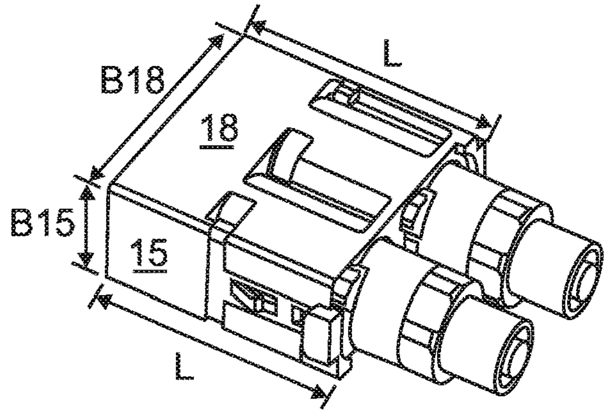
FIGS. 4*a, b* show the two plug connector modules in the assembled state.
Figure 4B:
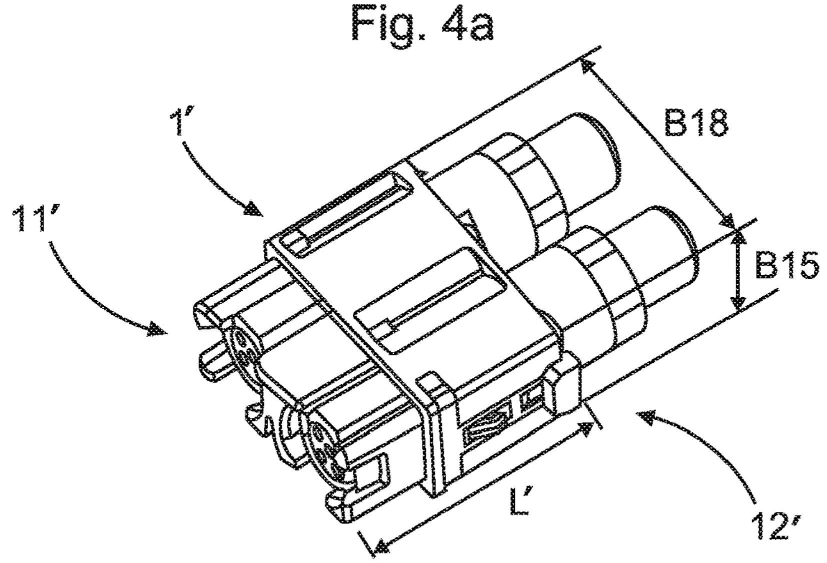
FIG. 4*c* shows the first and the second plug connector module in the non-plugged state.
Figure 4C:
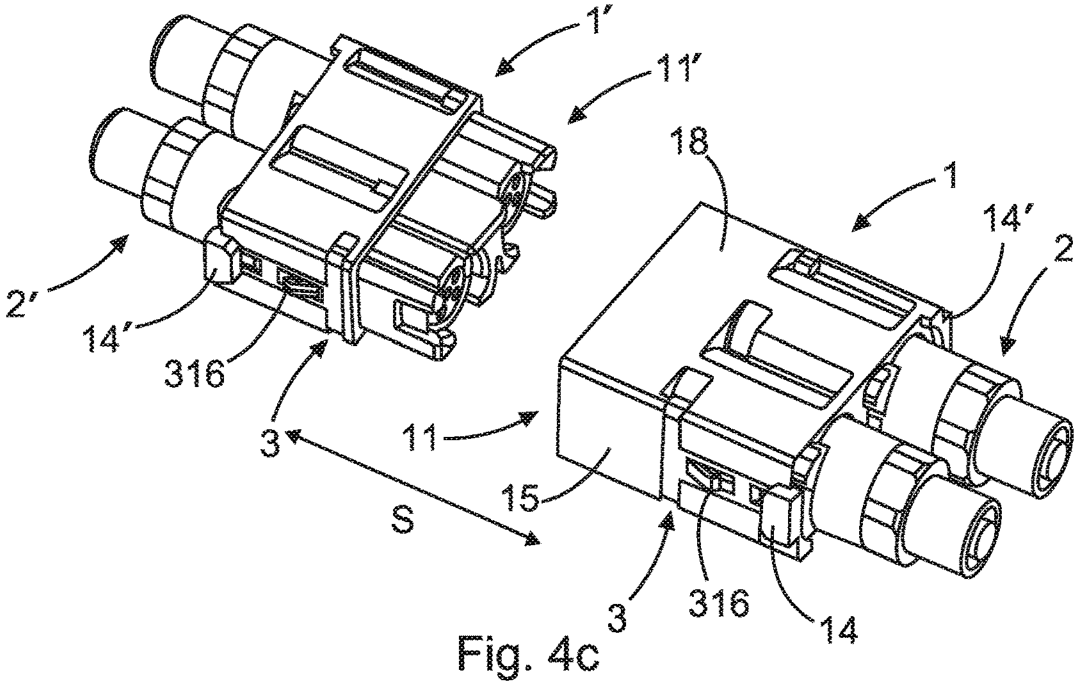

FIGS. 4*a*, 4*b* and 4*c* show completely assembled plug connector modules 1, 1' on which the contact springs 3 are locked at the narrow side by the locking hooks 313 thereof engaging on the locking edges 131 thereof.

The plug connector modules 1, 1' have in each case two elementary connectors 2, 2' which are received in the receiving openings 120, 120' of the respective insulating member 1, 1'.

In addition, in the drawing the lengths L, L' of both plug connector modules and the width B15 of the end faces 15 thereof and the width B18 of the side faces 18 thereof are also indicated. It is obvious that the width B18 of the side faces 18 is greater than the width B15 of the end faces 15. Furthermore, it can be clearly seen that the length L, L' of the modules, which in each case at the same time represents the length of the end faces 15, 15' and side faces 18, 18', is greater than the width B15 of the end faces 15, 15'. The widths B15 and B18 of both plug connector modules 1, 1' correspond for reasons of compatibility. The lengths L, L' thereof may differ from each other, but may also be identical.

In FIG. 4*c*, the insertion direction S which is expressly a direction but not an orientation is also indicated. In this insertion direction S, the two plug connector modules 1, 1' shown can be assembled.

It is further clear that the length L, L' of the insulating members 1, 1' is measured in each case in the insertion direction S and the respective width B15, B18 of the end and side faces is measured perpendicularly thereto.

Each of the two insulating members 1, 1' has two securing lugs 14, 14', that is to say, a wide securing lug 14 and a narrow securing lug 14', which therefore differ in terms of their width.

There is thereby provided the correct orientation of the plug connector modules 1, 1', for example, in a plug connector modular frame which is not shown here, of the receiving members which fit the securing lugs, for example, apertures or recesses. This is also inter alia important for the flexible earthing concept. If, for example, multiple earthings are intended to be avoided, for example, with both plug connector modules 1, 1' illustrated, the contact springs 3 which in each case are located at the narrow side 15, 15' on which the narrow securing lug 14' is located can be removed, whilst at the narrow side 15,15' which has the wide securing lug 14 a contact spring 3 is locked. It can thus be ensured that at least as a result of plug connector modules 1, 1' there is no multiple earthing even in the plugged state.

Figure 5A:
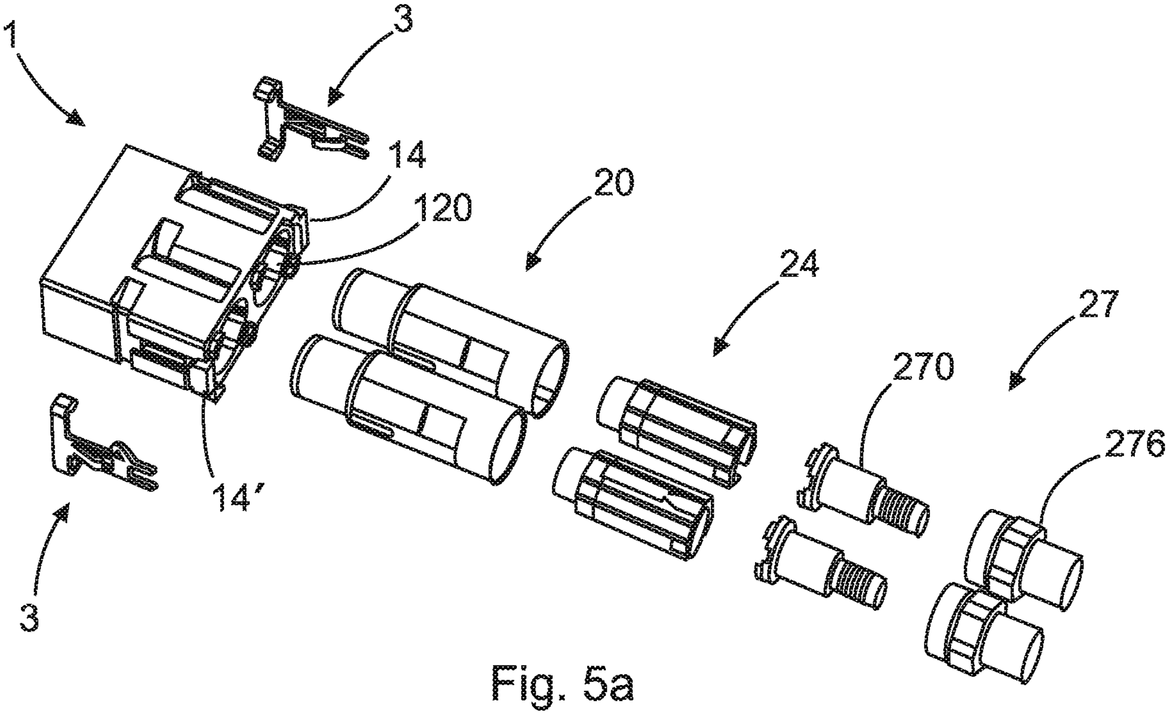
FIGS. 5*a*, 5*b* show the first and the second plug connector module as an exploded view.
Figure 5B:
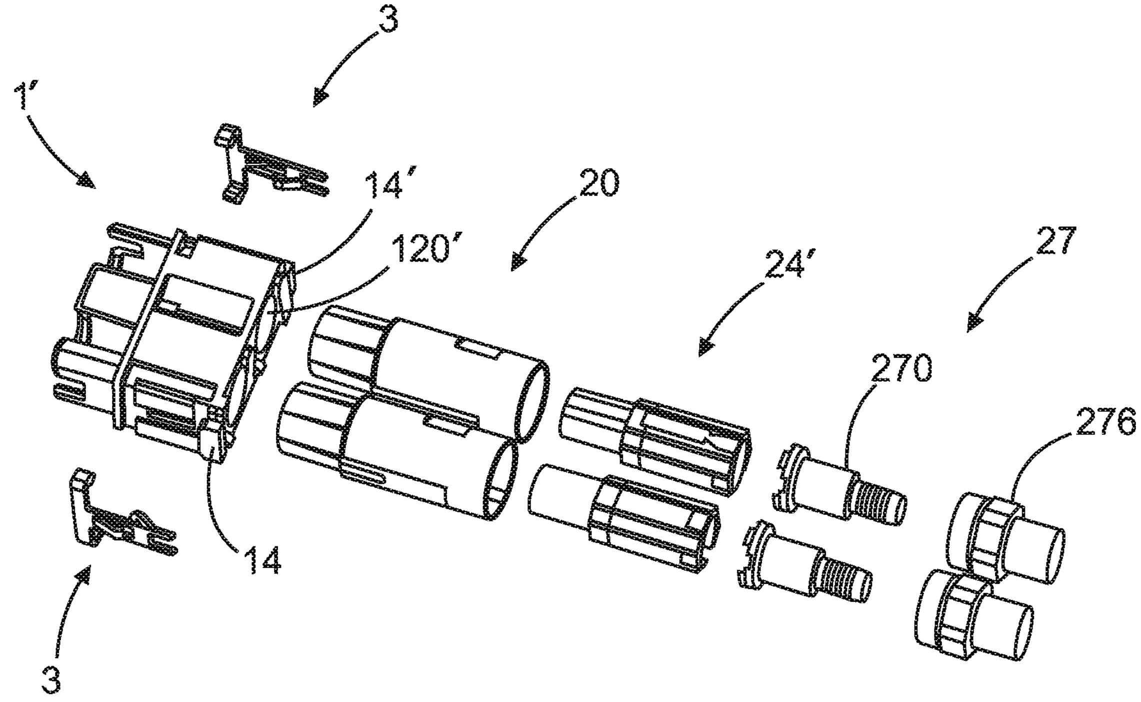

FIGS. 5*a* and 5*b* show both plug connector modules as an exploded illustration in each case. In addition to the components 1, 1', 14, 14, 3, 20, 20' already mentioned and described, particularly the additional components of the elementary plug connectors should be mentioned, that is to say, in addition to the shielding housing 20, 20' in each case a contact carrier 24, 24' which can be inserted therein and which has contact receiving members in which a plurality of plug contacts which are not shown are received. Furthermore, each of the elementary plug connectors 2 has a cable output 27 comprising a bend protection 270 and a cable screw connection 276.

LIST OF REFERENCE NUMERALS

1, 1' Insulating member
11, 11' Insertion region
12, 12' Connection region
120, 120' Receiving openings
13, 13' Locking means, locking recesses
131 Locking edge
14, 14' Securing lugs
15 End faces
150 Contact aperture
18 Side faces
B15 Width of the end face
B18 Width of the side faces
L, L' Length of the respective insulating member/the end faces and side faces
S Insertion direction
2,2' Elementary connector
20, 20' Shielding housing
24, 24' Contact carrier
27 Cable output
270 Bend protection
276 Cable screw connection
3 Contact spring
31 Locking arms
313 Locking hook
315 Inner contact tongue
316 Outer contact tongue
35 Base member

The invention claimed is:

1. A plug connector module for receiving a plug connector modular frame, the plug connector module comprising:
a substantially cuboid insulating member (1, 1'), having two mutually parallel, opposing end faces (15, 15'),
wherein the end faces (15, 15') have a substantially rectangular basic shape having a length (L, L') and a width (B15, B15'), wherein the length (L, L') extends in an insertion direction(S) and exceeds the width (B15, B15'), wherein an outwardly facing securing lug (14, 14') is formed on both end faces (15, 15'), wherein the two securing lugs (14, 14') differ from each other in terms of their size and/or shape in order to thereby ensure a correct orientation of the plug connector module (1, 1') in the plug connector modular frame, two mutually opposing side faces (18, 18') which are arranged perpendicularly to the end faces (15, 15'), wherein the side faces (18, 18') also have a substantially rectangular basic shape and are wider than the two end faces (15, 15'), and a connection region (12, 12') which is arranged at a first end of the insulating member (1, 1'), and an insertion region (11, 11') which is arranged at a second end of the insulating member (1, 1') opposite the first end, and two continuous receiving openings (120, 120') which connect the connection region (12,12') to the insertion region (11, 11'), of which one receiving opening (120, 120') is arranged in each case on one of the two end faces (15, 15') so as to extend in the insertion direction (S), and at least two locking means (13, 13') for locking two contact springs (3) which can be locked on the insulating member (1, 1') from an outer side at the end face, and two contact apertures (150), of which one is arranged in one of the two end faces (15, 15') in each case;

two elementary connectors (2, 2'), of which one is received and retained in each receiving opening (120, 120') of the insulating member (1, 1') or at least can be received and retained therein, wherein each of the two elementary connectors (2, 2') has an individual shielding housing (20, 20') and a plug contact arranged in the shielding housing (20, 20'); and the two contact springs (3, 3') which can be locked onto the insulating member (1, 1') from the outer side at the end and which each have at least the following:

an inner contact tongue (315), by means of which the contact spring (3) in a locked state thereof engages through the contact aperture (150) of the respective end face (15, 15') in order to electrically contact the shielding housing (20, 20') of the respective elementary plug (2, 2'), and an outer contact tongue (316) for electrically contacting the plug connector modular frame.

2. The plug connector module as claimed in claim 1, wherein the locking means are in the form of locking recesses (13, 13') in a surface of the insulating member (1, 1'), wherein the locking recesses (13, 13') extend into the side faces (18, 18') of the insulating member (1, 1').

3. The plug connector module as claimed in claim 1, wherein the insulating member (1, 1') is configured in an integral manner.

4. The plug connector module as claimed in claim 1, wherein the insulating member (1, 1') is an injection-molded component and comprises plastic material, and wherein the contact springs (3) are punched bent components and comprise resilient sheet metal, and wherein the shielding housings (20, 20') have a substantially hollow-cylindrical basic shape and comprise metal.

5. The plug connector module as claimed in claim 1, wherein the elementary connectors (2, 2') are locked or at least can be locked in the receiving openings (120, 120') of the insulating member (1, 1').

6. The plug connector module as claimed in claim 1, wherein the elementary connectors (2, 2') are round plug connectors.

7. The plug connector module as claimed in claim 6, wherein the elementary connectors (2, 2') are in each case M12 connectors, wherein each of the M12 connectors has eight plug contacts, of which four contact pairs which are provided for differential signal transmission are formed, wherein the four contact pairs are shielded with respect to each other by a shield cross, wherein the shield cross is connected to the shielding housing of the M12 connector in an electrically conductive manner for earth connection.

8. A method for producing a plug connector module as claimed in claim 1, comprising:

introducing the two elementary connectors (2, 2') into the two receiving openings (120, 120') of the plug connector module at a cable connection side;

locking one or both contact springs (3) on the insulating member (1, 1') at the end face, wherein the respective contact spring (3) engages through the respective contact aperture (150) of the insulating member (1, 1') with the inner contact tongue (315) thereof;

electrically contacting the respective shielding housing (20, 20') of one or both elementary plug connectors (2, 2') by the respective contact spring (3) with the inner contact tongue (315) thereof.

9. A plug connector modular system having an at least partially metal plug connector modular frame and at least one plug connector module as claimed in claim 1 which is retained thereby, wherein at least one of the two contact springs (3) is locked at the end face on the insulating member (1, 1') and engages with the inner contact tongue (315) thereof through the contact aperture (150) of the respective end face (15) and electrically contacts the shielding housing (20, 20') of the elementary connector (2, 2') which is arranged on this end face (15, 15'), and wherein the contact spring (3) with the outer contact tongue thereof (316) electrically contacts the plug connector modular frame.

10. The plug connector modular system as claimed in claim 9, wherein the plug connector modular frame additionally has a separate earth connection for a separate earthing cable.

11. A plug connector having an at least partially metal plug connector housing and a plug connector modular system as in claim 9 which is inserted therein, wherein the plug connector housing is connected to the plug connector modular frame in an electrically conductive manner.

12. A method for producing a plug connector modular system as claimed in claim 9, comprising:

introducing the two elementary connectors (2, 2') into the two receiving openings (120, 120') of the insulating member (1, 1') in the connection region;

locking one or both contact springs (3) on the insulating member (1, 1') at the end face, wherein the respective contact spring (3) engages through the respective contact aperture (150) of the insulating member (1, 1') with the inner contact tongue (315) thereof;

electrically contacting the respective shielding housing (20, 20') of one or both elementary plug connectors (2, 2') by means of the respective contact spring (3) with the inner contact tongue (315) thereof;

receiving the plug connector module in the plug connector modular frame, and retaining the plug connector module by means of the plug connector modular frame, and electrically contacting the plug connector modular frame by the respective contact spring (3) by means of the outer contact tongue (316) thereof and thereby producing an electrical earth connection between the plug connector modular frame and the respective shielding housing(s) (20, 20') of the plug connector module.

13. A contact spring (3) for electrical earth connection of a shielding housing (22, 22') of an elementary connector (2, 2') which is arranged in an insulating member (1, 1') of a plug connector module, having an at least partially metal plug connector modular frame, wherein the contact spring (3) comprises at least the following:

an inner contact tongue (315) for engaging through a contact aperture (150) of the insulating member (1, 1') and for electrically contacting the shielding housing (22, 22');

an outer contact tongue (316) for electrically contacting the plug connector modular frame;

a planar base member (35), from which the inner contact tongue (315) and the outer contact tongue (316) are punched and they are bent out of the plane thereof, two locking arms (31) which initially extend in the plane of the base member (35) and which protrude opposite each other at right angles from the base member (35) and ends of which are bent round by means of a locking bending operation to form locking hooks (313) in order to be able to clip the contact spring (3) onto and to unclip the contact spring (3) from the insulating member (1, 1').

14. The contact spring (3) as claimed in claim 13, wherein the contact spring (3) is in the form of a punched bent component and comprises resilient sheet metal.

15. The contact spring (3) as claimed in claim 13, wherein the inner contact tongue (315) extends in an assembled state in an insertion direction.

* * * * *